(12) United States Patent
Al-Hamrani

(10) Patent No.: US 6,975,946 B2
(45) Date of Patent: Dec. 13, 2005

(54) REACTIVE POWER OPTIMIZATION WITH ADAPTIVE EXCITATION CONTROL

(75) Inventor: Majed Al-Hamrani, Dharan (SA)

(73) Assignee: Saudi Arabian Oil Company, Dhahran (SA)

( * ) Notice: Subject to any disclaimer, the term of this patent is extended or adjusted under 35 U.S.C. 154(b) by 327 days.

(21) Appl. No.: 10/601,603

(22) Filed: Jun. 23, 2003

(65) Prior Publication Data

US 2004/0260488 A1 Dec. 23, 2004

(51) Int. Cl.$^7$ .............................. H02P 1/46; H02P 1/54; G06F 19/00

(52) U.S. Cl. ......................... 702/60; 318/712; 700/297; 700/298; 322/59

(58) Field of Search .............................. 702/60, 61, 64, 702/65; 700/286, 291, 295, 297, 298; 318/700, 712, 716, 717; 322/28, 59

(56) References Cited

U.S. PATENT DOCUMENTS

| | | | |
|---|---|---|---|
| 3,936,722 A | | 2/1976 | Goto et al. |
| 4,714,869 A | * | 12/1987 | Onitsuka ..................... 322/20 |
| 4,982,147 A | | 1/1991 | Lauw |
| 5,321,308 A | | 6/1994 | Johncock |
| 5,355,083 A | * | 10/1994 | George et al. ............... 324/229 |
| 5,440,222 A | * | 8/1995 | Tanaka et al. ................ 322/25 |
| 5,483,147 A | | 1/1996 | Ilic et al. |
| 5,541,510 A | * | 7/1996 | Danielson .................... 324/233 |
| 6,208,120 B1 | | 3/2001 | Gibbs |
| 6,232,751 B1 | | 5/2001 | Farr et al. |
| 6,265,852 B1 | * | 7/2001 | Kitamura et al. ............. 322/59 |
| 6,323,618 B1 | | 11/2001 | Kitamura et al. |
| 6,329,773 B1 | | 12/2001 | Xia et al. |
| 6,762,592 B2 | * | 7/2004 | Noguchi et al. .............. 322/28 |
| 6,847,184 B2 | * | 1/2005 | Noguchi et al. ............. 318/700 |

OTHER PUBLICATIONS

Schaefer, "Excitation Control of the Synchronous Motor", IEEE, 1998.*
Eberly et al., "Voltage Versus Var/Power–Factor Regulation on Synchronous Generators", IEEE, 2002.*
Majed M. Al Hamrani, Reactive Power Optimization Using Adaptive Excitation Control of Synchronous Motors, Thesis, Jun. 25, 2002, Oregon State University.
Kevin D. Becker, Power Factor Correction With Synchronous Machines, EC&M, Dec., 1993, pp. 47–48, 50, 52. and 56–57.
M. M. Al–Hamrani, A. Von Jouanne, A. Wallace, Power Factor Correction in Industrial Facilities Using Adaptive Excitation Control of Synchronous Machines, IEEE, Jun. 17, 2002.
Stanley R. Shilling, P.E., Programmable Logic Controller for Synchronous Motors, Saudi Aramco Engineering Report —SAER–5612, Jun. 1994, Dhahran.

(Continued)

Primary Examiner—Patrick J. Assouad
(74) Attorney, Agent, or Firm—Bracewell & Giuliani LLP

(57) ABSTRACT

Reactive power (VAR) consumption in a power plant or facility having synchronous machines is adaptively controlled in an automated manner. Electrical parameters of the plant are dynamically monitored during plant operation, and the overall plant power system is brought to an optimum operating point under control of a microprocessor-based power measurement system. The microprocessor-based power measurement system adaptively changes the excitation system of synchronous machines in the plant based on results of monitoring. The excitation systems of the synchronous machines may be adjusted to be constant bus voltage, constant reactive power, or constant power factor, according to optimum system performance requirements. The power measurement system also assists in avoiding problems in voltage regulation during increased load demand conditions, such as when starting large electrical motors or energizing large transformers in the system.

26 Claims, 11 Drawing Sheets

OTHER PUBLICATIONS

Liu Nian; Teng Fusheng, The New Intelligent Monitoring Method for Operating States of Large Generator Units, IEEE Power Engineering Society Winter Meeting, vol. 1, Jan. 2000, pp.

Montero, L.R.R., Monitoring and Control System Based on Microcomputer for Synchronous Generator, IEEE Transactions on Energy Conversion, vol. 14, No. 4, Dec. 1999.

* cited by examiner

REACTIVE POWER OPTIMIZATION WITH ADAPTIVE EXCITATION CONTROL

BACKGROUND OF INVENTION

1. Field of Invention

The present invention relates to energy conservation in industrial plants and other facilities. More particularly, the present invention relates to control of reactive power consumption in such plants and facilities.

2. Description of the Prior Art

It has become a common practice in industrial facilities to pay increased attention to energy conservation programs. Efficient usage of electrical energy has become a matter of increasing concern, and electrical energy costs often are an important factor in overall expenses of an industrial plant or other facility driven by electrical power.

Where electrical power is furnished as alternating current (or AC) power, one way to save energy has been to improve the power factor (PF). As is known, the power factor of alternating current in a system is the ratio of real power to apparent power, or in effect the cosine of the phase angle between voltage and current in the system. Conventional methods of power factor (or PF) improvement have used two techniques. One type has capacitor banks, while the other has used compensators known in the art as VAR compensators. However, so far as is known, traditional methods of power factor improvement have not supervised or monitored the overall power system at the plant or facility of interest. There has been, so far as is known, no dynamic control or feedback obtained based on system operating parameters as an attempt to optimize power factor correction or improvement.

Certain industrial facilities have often employed considerable synchronous motor loads. For example, a typical natural gas processing plant may have from 40% to 45% of the electrical load composed of synchronous motors which drive large gas compressors. It has also been recognized that synchronous machines have the ability to generate reactive power. However, these motors have operated in industrial plants at a constant power factor, without considering either overall system performance or dynamic changes in the plant's power distribution system during operation. As a result, considerable amounts of electrical power beyond that actually needed for the actual plant electrical load have been required to be imported to meet actual load requirements. The imported power was costly, and often was at even higher or premium rates when imported at times of peak demand.

SUMMARY OF INVENTION

Briefly, the present invention provides a new and improved method and apparatus for power control and conserving energy in a facility having synchronous machines. Incoming power to the facility is monitored. In addition, demands of the facility for reactive power are monitored. The synchronous machines and their operation in the facility are also monitored. Based on the results obtained from monitoring, an operation mode for the synchronous machines is selected in order to bring the power factor to an optimum level. Based on the operation mode selected, excitation parameters of the synchronous machines are adjusted to achieve a selected operation mode for them and conserve energy in the facility.

BRIEF DESCRIPTION OF THE DRAWINGS

The objects, advantages and features of the invention will become more apparent by reference to the drawings appended thereto, wherein like numerals indicate like parts and wherein an illustrated embodiment of the invention is shown, of which.

DESCRIPTION OF THE PREFERRED EMBODIMENT

Figure 1:
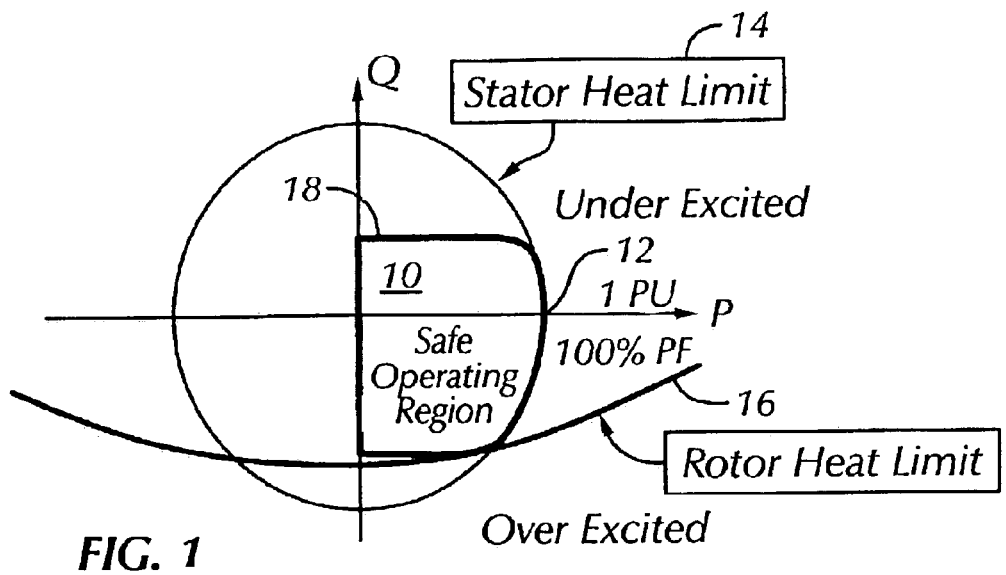
FIG. 1 is a diagram showing typical capability curves of a synchronous motor.

At the outset, some explanatory materials relating to synchronous motors are provided for explanatory and general introductory purposes. Synchronous motors can be controlled to produce or absorb reactive power, also referred to as Q. When the motor operates at unity power factor, the machine is neither producing nor absorbing reactive power, (Q=0). Synchronous machines have limits that should not be exceeded in order to keep them at rated operational conditions. FIG. 1 shows typical motor capability curves for a synchronous motor.

A synchronous motor can be operated safely in the encircled safe operating region or area indicated by reference numeral 10. FIG. 1 is a plot of real power P and reactive power Q for a typical synchronous motor. A location 12 on the horizontal or real power axis P identifies the operation of the synchronous motor at the ideal operating point of a unitary or 100% power factor.

For operations in areas in the plot of FIG. 1 above the axis P, where the synchronous motor is absorbing, also termed consuming, reactive power Q, the synchronous motor is under excited. The field rotor current is less than the needed magnetomotive force for magnetizing current for motor operation.

For operations in the areas in the plot of FIG. 1 below the axis P, the synchronous motor is over excited. The field rotor current is more than needed for magnetizing current for motor operation.

A circle 14 defines a practical limit where the amount of stator heat resulting from motor operations should not be exceeded. The circle 14 illustrates an approximate maximum limit for stator current. The stator current limit is the maximum continuous current that the stator conductors can carry without being damaged. Otherwise motor damage may result.

A line 16 in FIG. 1 illustrates a rotor heat limit, where operations should not be exceeded to prevent heat damage to the rotor. The rotor current limit is the maximum field current or excitation current that the DC excitation system of the synchronous motor can carry. These rated currents are usually provided with the motor, for example on its nameplate. An upper boundary 18 of the safe operating region 10 in the plot of FIG. 1 roughly illustrates the machine stability limits.

Synchronous motors can be controlled to produce or absorb reactive power, Q, by controlling their excitation current, or the field rotor current, $I_F$. The field current produces the magnetic field of the rotor that interacts with the stator rotating magnetic field to produce motion. The stator magnetic field is produced by the line currents, or the armature current, $I_A$. The motor can be controlled to generate reactive power at various power factors by selection of appropriate field currents.

Figure 2:
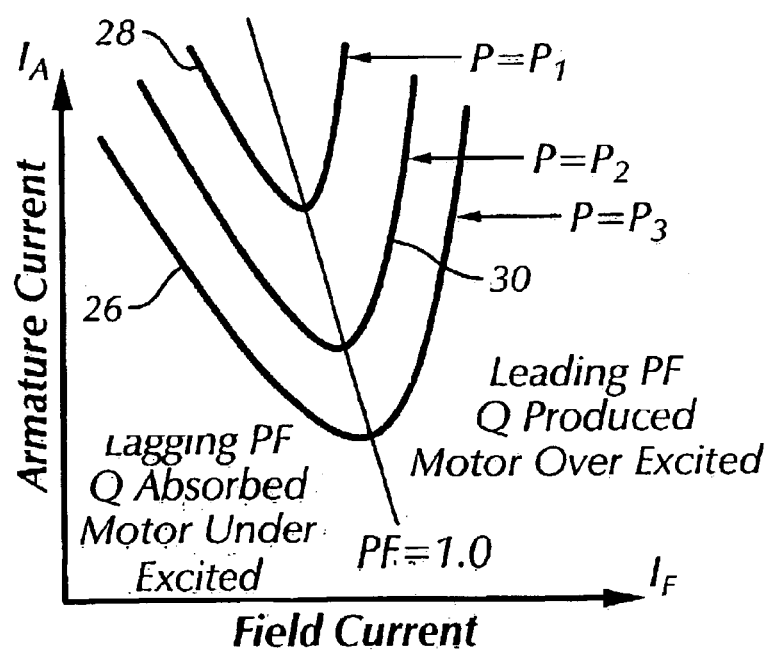
FIG. 2 is a plot of armature current versus field current in a synchronous motor for different levels of real power.

The intensity of the field current is related to the power factor of the synchronous machine, and hence the production or absorption of Q. FIG. 2, shows a plot, known as a V curve, for a typical synchronous motor of the armature current $I_A$ versus field current $I_F$ at three different power levels, $P_1$, $P_2$ and $P_3$.

The three different V curves 26, 28 and 30 correspond to different levels of real power $P_1$, $P_2$, and $P_3$. For each of the curves 26, 28 and 30, the minimum armature current $I_A$ occurs at unity power factor, when only real power (kW) is being consumed by the motor. At any other point on the curves, some reactive power is being either consumed or produced by the motor, depending on the field current $I_F$. For $I_F$ less than the value giving the minimum $I_A$, the armature current is lagging and the motor will absorb reactive power (+Q). The motor in this mode of operation is often called under excited. For $I_F$ greater than the value giving the minimum $I_A$, the armature current is leading and the motor will produce reactive power (−Q), and motor in this mode is often called over excited.

Excitation Control

Traditional control of synchronous machines has three modes of excitation control. Excitation control in industrial facilities is usually performed on each individual machine. As has been noted, this control is done without looking into the entire power system and the effects of an individual machine on other equipment.

Figure 3:
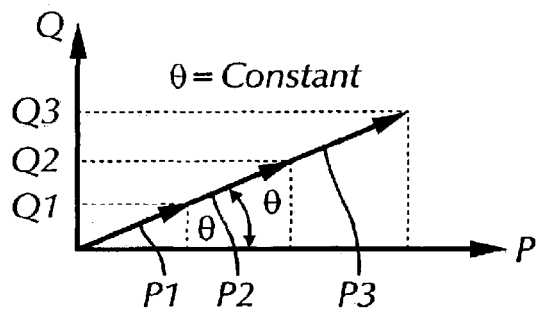
FIG. 3 is a diagram of real power versus reactive power for a synchronous motor in a constant power factor operating mode with different loads at the same power factor.

Constant power factor is exercised where the field current is set to a value to keep the motor maintaining a constant power factor. It is important to notice that in a facility or plant with numerous motors, this is the motor's power factor which is often quite different than the overall power factor of the plant. As mentioned earlier, this mode of operation is widely used in industrial plants and the motor excitation system keeps the motor running at unity power factor. FIG. 3 shows a synchronous motor running at a constant, non-unity power factor operating mode for power levels P1, P2 and P3 with different loads.

Figure 4:
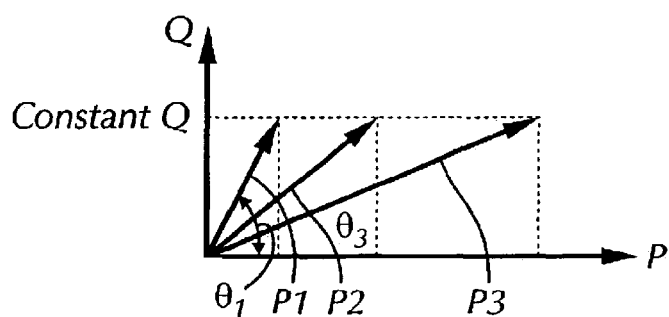
FIG. 4 is a diagram of real power versus reactive power for a synchronous motor in a constant reactive power operating mode with different loads and constant reactive power.

In a constant reactive power mode, the excitation system sets the motor to produce or absorb a constant value of reactive power, Q. The power factor in this mode changes as real power changes. As shown in FIG. 4, the motor produces three different levels of real power, at different power factors, for constant reactive power Q in the constant reactive power operation mode.

Figure 5:
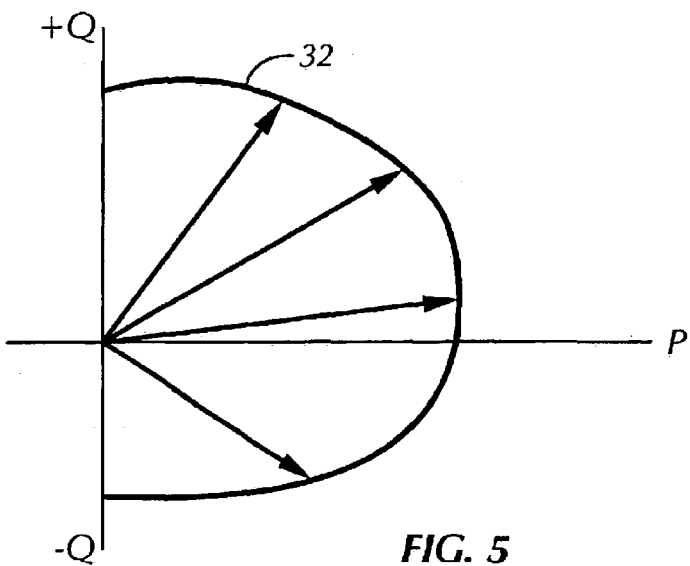
FIG. 5 is a diagram of real power versus reactive power for a synchronous motor in a constant voltage mode and different loads.

In a constant voltage mode, excitation control is adjusted to maintain constant bus voltage at the output of the motor. A curve 32 in FIG. 5 illustrates a constant bus voltage with several resultant mixtures of real power P and reactive power Q. If the bus voltage is higher than a preset value, the excitation control is caused to force the machine to decrease Q generation. On the other hand, when the bus voltage level drops, the excitation control forces the machine to increase Q generation.

Adaptive Excitation Control

With the present invention, adaptive excitation control is provided. The adaptive excitation control has been found more effective in ability to get global supervision and feedback from the entire power system in the plant or facility. Based on this real-time feedback, the system being controlled changes excitation to bring the entire system to a predetermined optimum operating point. Depending on the operation status of the plant's system, the adaptive excitation control system of the present invention switches excitation control of the machines to any of the above modes.

The adaptive excitation control system has the ability to adjust itself and change levels of excitation control based on information provided by sensors or metering devices. Moreover, the adaptive excitation control system can be customized to predict future changes to the electrical system so that it can adjust itself to increase system reliability. For example, as will be discussed, the adaptive excitation control system can be instructed prior to starting of a large motor to increase available, reactive power to support system voltage and provide required reactive power during the large machine starts. This can also be applied in the event of energizing large transformers as well.

Adaptive excitation control according to the present invention is implemented in an energy management system known as an ION Enterprise network of power monitoring, analysis and control operating software commercially available known as PEGASYS. The ION Enterprise network and the PEGASYS software are available from Power Measurement, Ltd. of Canada, and are currently being used for other types of power monitoring in some petrochemical plants. It should be understood that adaptive excitation control according to the present invention can be implemented in metering or power measurement systems available from other sources or manufacturers as well.

Figure 6:
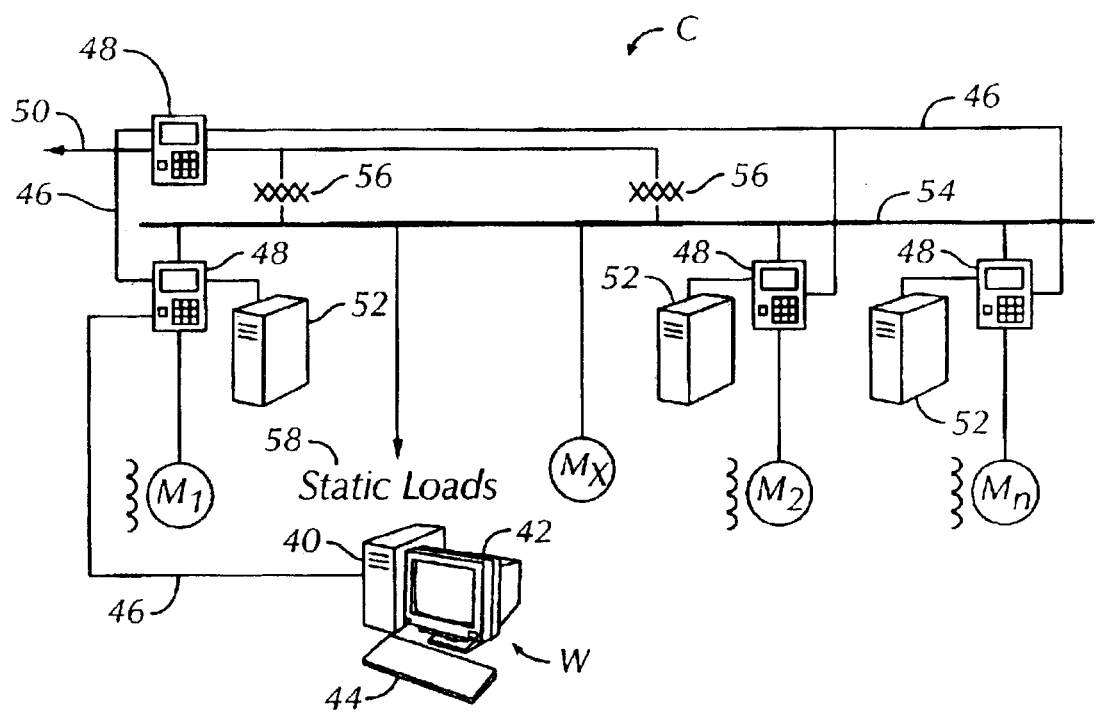
FIG. 6 is a schematic diagram of a power control system according to the present invention with adaptive excitation control of synchronous motors.

FIG. 6 is a schematic diagram of an example installation of an adaptive excitation control system C according to the present invention. The control system C includes a workstation W of the ION Enterprise Network. The workstation W thus serves as a power monitoring system. The workstation W is connected by a communications link, which may be Ethernet, RS-485, RS-232, or radio wave. The communication link indicated schematically at 46 and connects the workstation W to a number of metering or monitoring devices 48. The workstation in the preferred embodiment is that available as a component of the ION Enterprise network using the PEGASYS software system each from Power Measurement Ltd. The workstation W is preferably in the form of a computer 40, display 42 and keyboard or other input object device 44. It should be understood that the computer 40 may, depending on the power measurement system used, be one of several forms of computing or control devices. For example, the computer may take the form of a microprocessor or-CPU based computing device, or it may be in the form of a programmable controller, or other form of logic or control device, as desired. Thus, with the present invention, it should be understood that the term computer should be construed as referring to these various forms of computing and control devices.

The metering or monitoring devices 48 of the control system C are preferably those available as Intelligent Electronic Devices (IEDs) from Power Measurement Ltd. to monitor the electrical parameters of major equipment including synchronous machines $M_1, M_2 \ldots M_n$ in the plant. The metering devices 48 are based on the Integrated Object Network (ION) technology available from Power Measurement Ltd. to customize the monitoring systems to perform virtually any kind of task. Electrical parameters and circuit breaker status data are transferred to the central workstation W for data processing. The system S includes a software component called Virtual Ion Processor (VIP) available from Power Measurement, Ltd. The VIP software component acts to monitor for operations for the entire plant. Both the VIP and metering devices 48 have modules that can be programmed to process instructions, codes, and perform control tasks.

As shown in FIG. 6, metering devices 48 are located and connected to measure operating parameters at a point of common coupling 50 to an electrical power providing utility, at a motor exciter system 52 for each of the synchronous motors $M_1$ and $M_2$ and between a main power supply bus 54 for the plant or facility and the synchronous motors of the facility. The facility also includes, as is typical, transformers 56, other motors such as $M_x$ which are not synchronous motors, and conventional static loads as indicated at 58.

The adaptive excitation control system C is implemented through a set of conventional computer instructions and decisions to implement the operations depicted schematically in FIGS. 7, 8, 12 and 13. The instructions are translated into command signals sent to the excitation panels to control the power factor and voltage levels of the plant.

The adaptive excitation control system C, based on the real-time data from workstation W and direct interface with the motor excitation control systems 52, performs the following functions:

Continuously monitor electrical parameters such as utility interface power factor at point of common coupling 50; power level in megawatts or kilowatts, MW or kW; and megavolt amperes, kilovolt amperes, MVAR or kVAR of reactive power of online synchronous machines shown as $M_1, M_2, \ldots M_n$ and voltage levels of the main of real power buses 54 supplying the plant.

Simulate synchronous machine capability curves like FIG. 1 and V curves like those of FIG. 2 and based on those curves locate the current operating point of each individual machine.

Identify the required control mode to achieve the optimum operating conditions whether constant power factor (FIG. 3), constant reactive power (FIG. 4) or constant voltage (FIG. 5).

Send control signals to the online synchronous machines $M_1$, $M_2$, etc. to perform required modes of operation. The control signals may be either analog or digital, as required by the control units for the synchronous machines in use.

The power measurement system dynamically performs the following functions:

Monitor the overall plant power factor and reactive power demand at the point of common coupling 50 with the utility.

Monitor the synchronous machines $M_1, M_2 \ldots M_n$, their status and loading.

Decide on the best operation mode to bring the plant total power factor as close to unity as possible, without compromising system stability and synchronous motor capability curves.

Change excitation parameters in the exciter systems 52 to achieve required conditions.

The principal concept of the adaptive excitation control according to the present invention is a closed loop control system that adjusts the field current (excitation circuit) of the synchronous motors. The adjustment is based on certain thresholds or set points that can be specified during the system programming stage. It is important to emphasize that this process is continuously running in real time.

A prototype system according to the present invention was programmed to keep the overall system power factor of the system S in the range of from −0.97 (97% Lagging) to +0.97 (97% Leading).

Finding the Overall PF ($PF_{tot}$)

The overall power factor of the system is determined by dividing total system real power (P, in kW) by the total system apparent power (S, in kVA). Individual meters are not able to perform such operations since the total power is the summation of power sensed by the individual power monitors 48 for the entire plant as shown in FIG. 6. Instead, the total real power, reactive power, and power factor are calculated in the VIP component of the PEGASYS software. As described earlier, the VIP can be considered as a global IED that can import, export, and manipulate data from different individual IED's. The following formulas were used in the VIP:

$$P_{tot} = P_{IED1} + P_{IED2}$$

$$Q_{tot} = Q_{IED1} + Q_{IED2}$$

$$S_{tot} = SQRT[(P_{tot})^2 + (Q_{tot})^2]$$

$$PF_{tot} = [P_{tot}/S_{tot}] * [ABS(Q_{tot})/Q_{tot}]$$

The quantity $Q_{tot}$ is used in the $PF_{tot}$ equation to impose a sign on the $PF_{tot}$. The same convention is used in the individual monitors 48, namely a negative power factor for lagging armature current and positive power factor for leading armature current.

Keeping $PF_{tot}$ Within a Specified Range

As has been mentioned earlier, one objective of the present invention is to maintain the overall power factor $PF_{tot}$ within −0.97 and +0.97 range. If the power factor becomes more "lagging", or greater than −0.97 and less than 0, the field currents of the synchronous motors are increased according to the present invention until the power factor returns to the desired range. On the other hand, if the power factor becomes more "leading", or less than 0.97 and greater than 0, the field currents of the synchronous motors in the system E are decreased until the power factor returns to the desired range.

In doing so, the system E also monitors and takes into account the capability curves of the type shown schematically in FIG. 1 for each of the synchronous motors in the plant or facility. Under any operating condition, the rated power for each synchronous motor shall not be exceeded.

Figure 7:
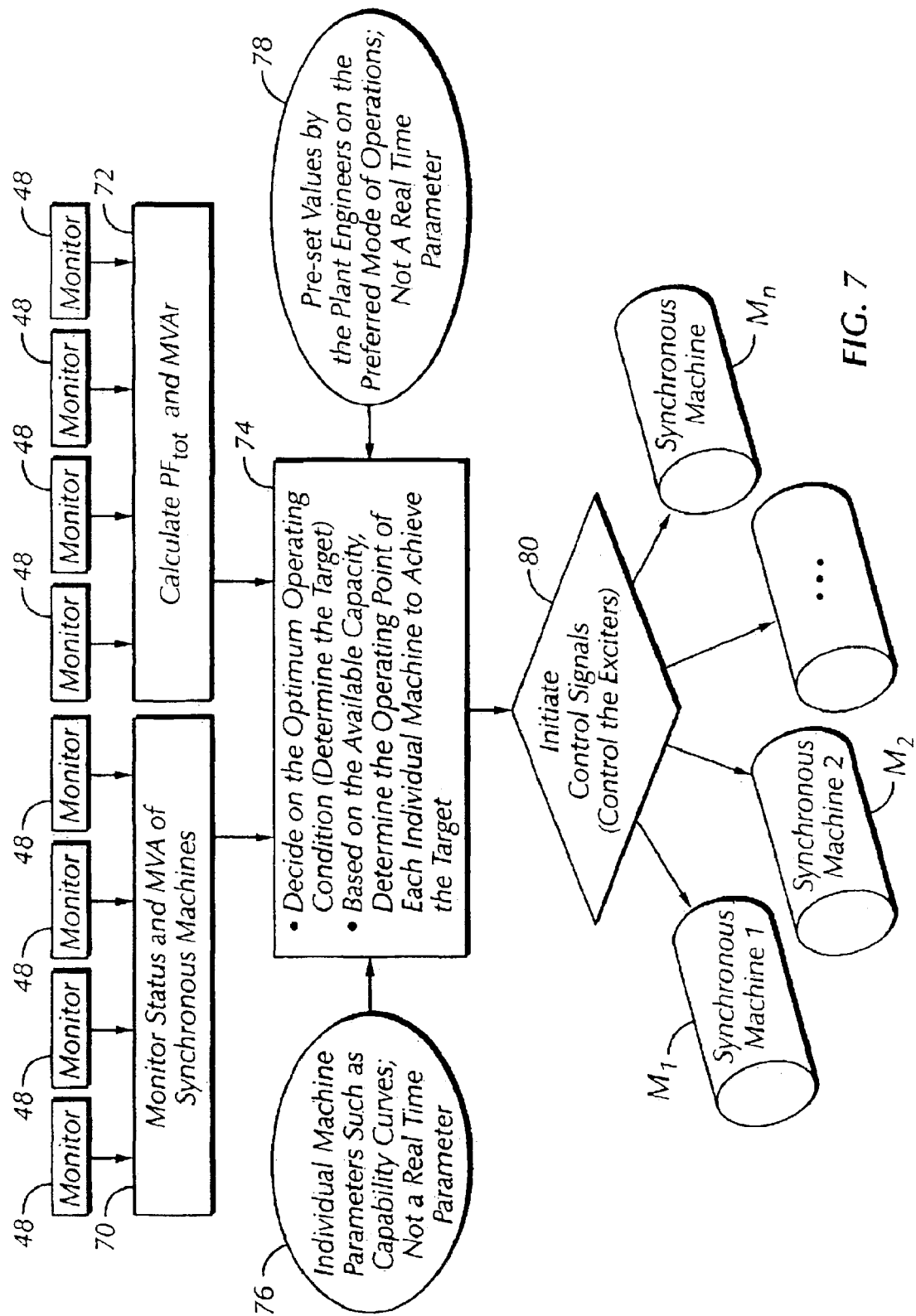
FIG. 7 is a flowchart of operation of the power control system of FIG. 6 performing adaptive excitation control.

FIG. 7 is a flow chart of operation of the excitation system E performing adaptive excitation control according to the present invention. As shown in step 70, the status of each of the monitors 48 monitoring the synchronous motors or machines $M_1, M_2 \ldots M_n$ in the plant is monitored to determine the operating status and the output megavolt amperes of MVA of total power from the synchronous motors. As shown in step 72, plant input power or power demand is monitored in monitors 48. The overall power factor $PF_{tot}$ and total MVAR for the plant are also determined during step 72 in the manner described above.

As indicated in step 74, the optimum operating condition or target operating point for the system is determined. As indicated at step 76, individual machine parameters such as their capability curves are provided as inputs and stored in the workstation W for performance of step 74. Similarly, as indicated at step 78, pre-set values for preferred modes of operation (constant reactive power, constant voltage, constant power factor) of the synchronous machines are provided and stored.

During the performance of step 74, based on the target or optimum operating condition determined for the system, the individual parameters for the synchronous machines and the preset values, and the available capacity, as well as the operating point in terms of field current and armature current for each individual synchronous machine in the plant are determined. In other words, a projection is made of the current operating point into the capability curve of the machine.

Figure 8:
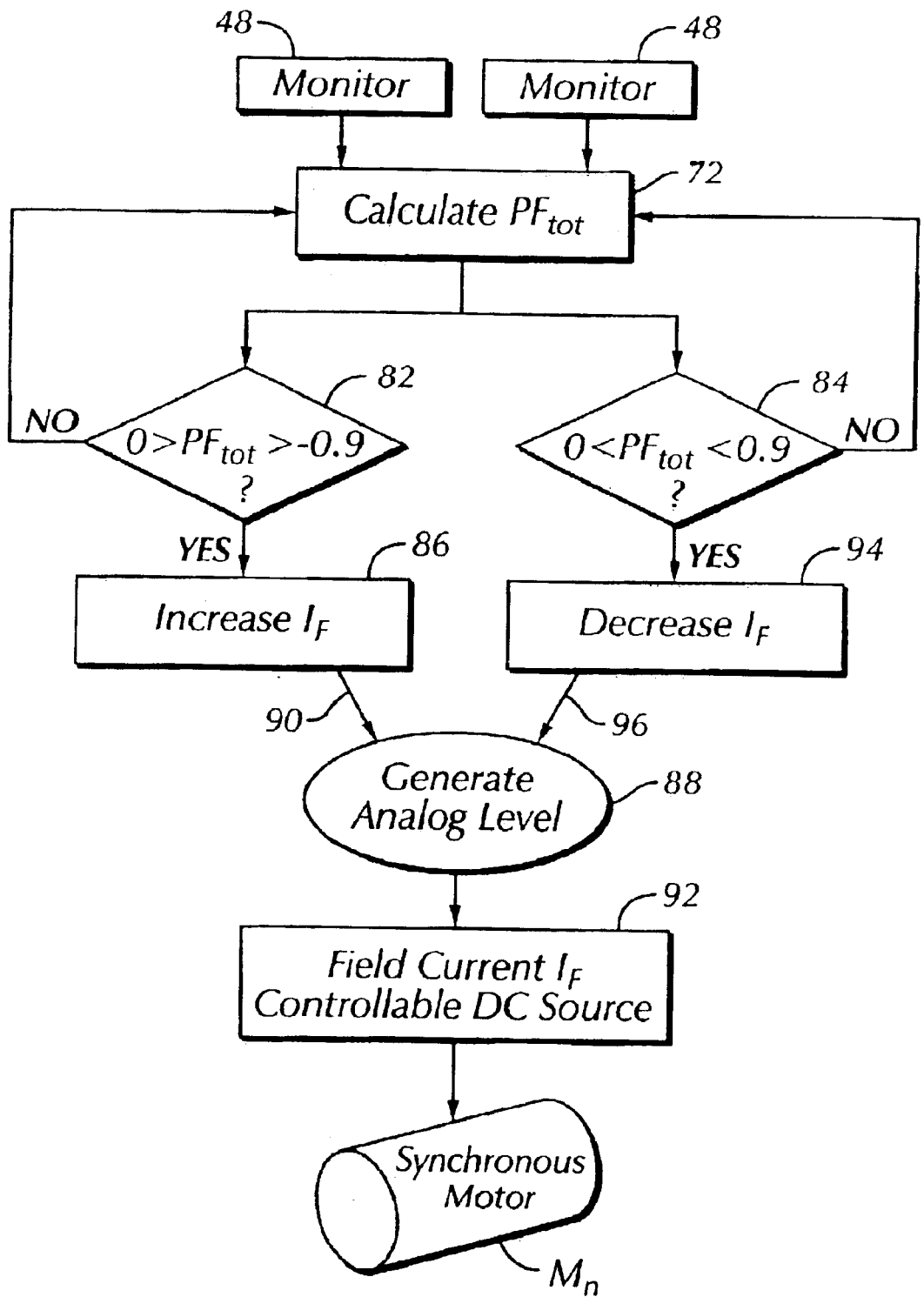
FIG. 8 is a more detailed flowchart of portions of the flow chart of FIG. 7.

As indicated at step 80, control signals for setting the level of excitation current of the various synchronous machines $M_1, M_2 \ldots M_n$ in the plant are then transmitted to these machines. FIG. 8 shows a conceptual chart of the control logic that maintains the $PF_{tot}$ within the −0.90 and +0.90 range. As shown in FIG. 8, monitors 48 for the synchronous motors provide inputs of the determination of overall power factor $PF_{tot}$ for step 72 in the manner previously described. Next, a decision instruction 82 determines whether the determined overall power factor $PF_{tot}$ is lagging, while a decision instruction 84 determines whether the determined overall power factor $PF_{tot}$ is leading. In the event that each of instructions 82 and 84 yields a negative response, performance returns to determination of the overall power factor $PF_{tot}$ according to step 72.

Should instruction 82 yield an affirmative response, an instruction 86 issues a control signal to increment the field current $I_f$. As shown in FIG. 8, where analog control signals are implemented, a digital to analog converter 88 is instructed to increment its analog output, which is provided as indicated at 90 to a controllable direct current source 92 which provides an increased direct current field current $I_f$ to the synchronous motor M being adjusted. The field current is increased in this manner until the power factor for the machines returns to the desired operating range.

Should instruction 84 yield an affirmative response, an instruction 94 issues a control signal to decrease the field current $I_f$. As shown in FIG. 8, the digital to analog converter 88 is instructed to decrease its analog output. The decreased analog output from converter 88 is provided as indicated at 96 to the controllable direct current source 92, which provides decreased field current. The field current is decreased until the power factor for the machine returns to the desired operating range.

Programming the Ion Modules

The monitors 48 and workstation W of the power monitoring system are based on ION (Integrated Object Network) technology available from Power Measurement, Ltd., as has been noted. The ION architecture is used to customize system nodes such as the monitors 48 and the workstation W. ION is formed of a set of functional building blocks called ION modules.

Figure 9:
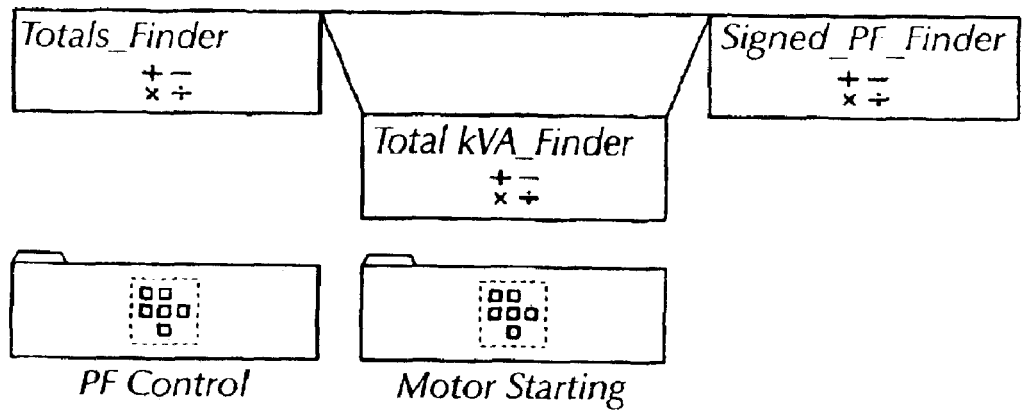
FIG. 9 is a representation of a computer screen in the power control system of FIG. 6 during the determination of total power factor of the system of FIG. 6.

There are about seventy different types of ION modules provided in a typical system, each of which performs specific tasks when required or programmed to do so. By combining (or linking) several modules together, custom functions are programmed for the required operations of adaptive excitation control system C of the present invention. A specific software component within the PEGASYS called ION designer is used to configure and customize the ION modules. As an example, the method used to calculate the total PF using the ION designer software to configure some ION modules. A screen capture of the ION Designer software is shown in FIG. 9.

Figure 10:
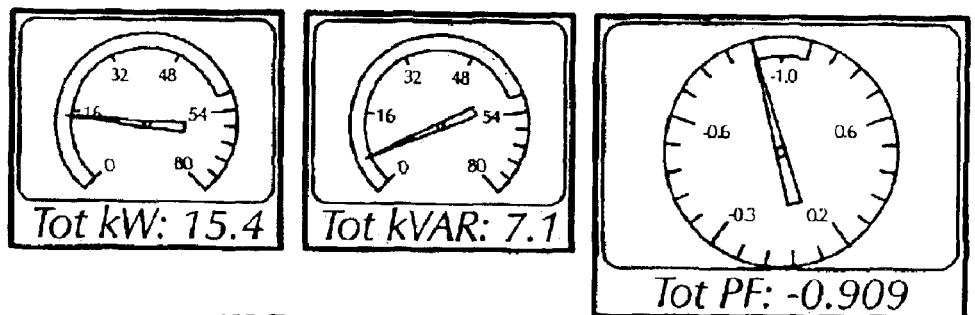
FIG. 10 is a representation of a computer display of calculated power and power factor in the power control system of FIG. 5.

The arithmetic module in the PEGASYS ION designer with the name Totals_Finder gets P and Q from each of the monitors 48 as module inputs. The Totals_Finder module adds the quantities from monitors 48 and the outputs of module Totals_Finder are $P_{tot}$ and $Q_{tot}$. An arithmetic module named Total kVA_Finder in the PEGASYS ION designer calculates the quantity $S_{tot}(S_{tot}=SQRT[P_{tot}^2+Q_{tot}^2])$. Another arithmetic module named Signed_PF_Finder in the PEGASYS ION designer receives the quantities $P_{tot}$, $Q_{tot}$, and $S_{tot}$ from the previously mentioned modules. The Signed_PF_Finder module calculates the power factor as previously described. The output of module Signed_PF_Finder is linked to a user interface program to display the output results. The update rate for this kind of module is once every second continuously. FIG. 10 shows a screen capture of calculated power in the kW, kMVA and also total power factor of the user interface program.

A prototype system was observed to respond very well to system changes and to react to the changes by either increasing or decreasing the excitation voltage to bring the system power factor within the specified range. The system was set to keep the power factor in the range of +0.90 to −0.90 in once case, and in another case within the range of +0.97 to −0.97. The system was tested several times with different loading conditions. System performance was good and its response to changes in the system was prompt.

Figure 11A:
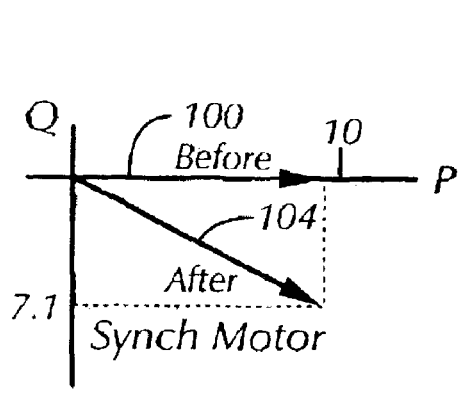
FIGS. 11A and 11B are diagrams of power factor improvement obtainable with the present invention.
Figure 11B:
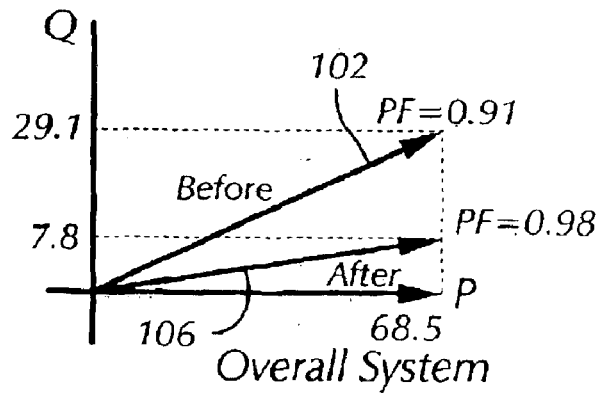

FIGS. 11A and 11B illustrate schematically power factor improvement obtainable in the present invention. As shown at 100 in FIG. 11A, a particular synchronous motor is operating at an ideal power factor of 1.0 and about 10 MW of total power. However, as indicated at 102 in FIG. 11B the overall system is operating to produce 68.5 MW of total power at a power factor of 0.91 in an under excited state, with some 29.1 MVA of reactive power, or +Q=29.1.

As indicated at 104 in FIG. 11A, control of the excitation field current of the same motor is adaptively adjusted to cause the motor to be under excited with 7.1 MW of reactive power, or −Q=7.1. The effect on the overall system from such a change in one motor is shown at 106 in FIG. 11B. The overall system total power remains 68.5 MW, but the power factor is increased to 0.98 and the reactive power in the over excited state is reduced from +Q=29.1 MVA to +Q=7.8 MVA.

Voltage Drop Improvement

With the present invention, the voltage drop in the power system for the plant during motor starts can be controlled and provide an improvement of the system stiffness before starting other motors in the system. This is done by over-exciting the operating synchronous machines to their operating limits before the other motors are started. The control logic of the adaptive excitation control system C is triggered to over excite the then operating or online synchronous machines $M_1, M_2 \ldots M_n$ a few seconds before the motor start event.

The adaptive excitation control system C is used to predict motor start using digital inputs. For example, one digital input to the monitor 48 for each motor is configured so that when the start bush button for that motor is pushed, the adaptive excitation system immediately changes the control mode from maintaining the overall power $P_{tot}$ within a specified range to a different mode. After some delay, typically around 1 second, the motor starts. In the new mode, the online or operating synchronous motors are overexcited to about 120% of their rated capacity for a limited period of time. The adaptive excitation system sends control pulses to monitors 48 for the online motors to change their digital outputs to the full or maximum scale. The DC power source 92 for each motor then injects the maximum field current to get the maximum reactive power from the online or running synchronous machines. This condition is then maintained for a specified time limit such as 20 seconds, during which the motor can be started. This time also causes a delay to the motor that needs to be started to allow running synchronous motors reach maximum over excitation condition. After this time limit of 20 seconds elapses, the adaptive excitation control system returns back to adjust the overall power factor between the range of +0.97 and −0.97.

The maximum digital output of source 92 enables production of approximately the full rated reactive power from each synchronous machine M. Exceeding the rated capacity of the machines for a small period of time of twenty seconds or so does not harm the machine. In suitable applications the machine could be over excited to about 150% of the machine's rated power. The flow chart of the motor starting prediction method is shown in FIG. 12.

Figure 12:
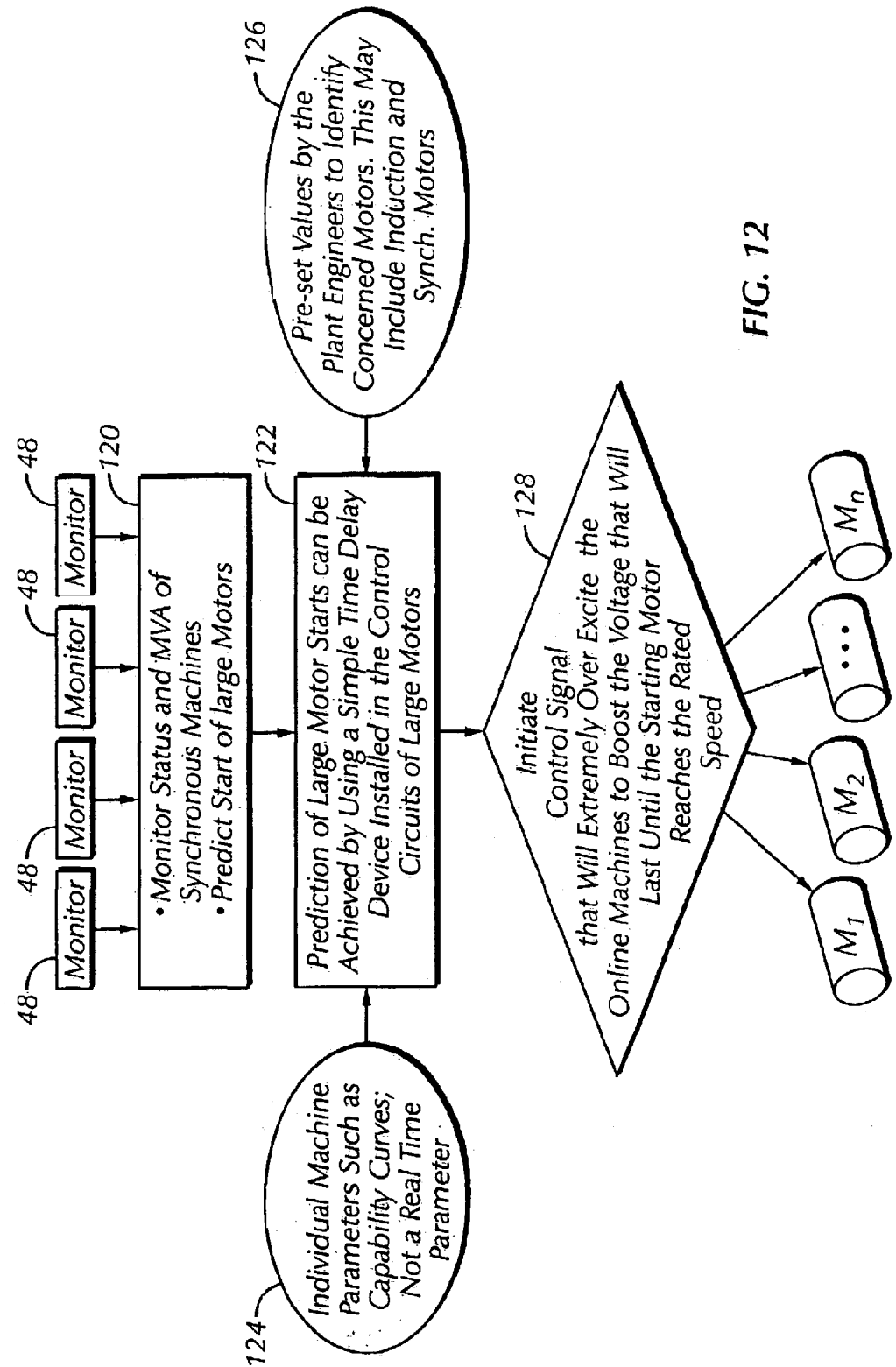
FIG. 12 is a flowchart of operation of the power control system of FIG. 6 during the starting of a motor in the system of FIG. 6.

As shown in FIG. 12, monitors 48 for the various machines or motors in the plant provide inputs to the workstation W in the customary manner and during a step 120, the status and MVA of the synchronous machines are monitored. In the event that it is predicted that a motor or machine is to be switched to and "ON" state. As indicated in the step 120, the workstation W changes to a different mode, indicated by step 122. Operating parameters for the individual machines used in step 122 are provided as indicated at step 124 and pre-set values to identify motors of interest are provided as indicated at step 126. During step 122, a control signal identifying full or maximum scale for field current to the online or operating synchronous motors is formed. Next, as indicated at step 128, the control signal for maximum field current to cause the online machines to become over excited is sent to the machines $M_1, M_2 \ldots M_n$ currently on line.

Figure 13:
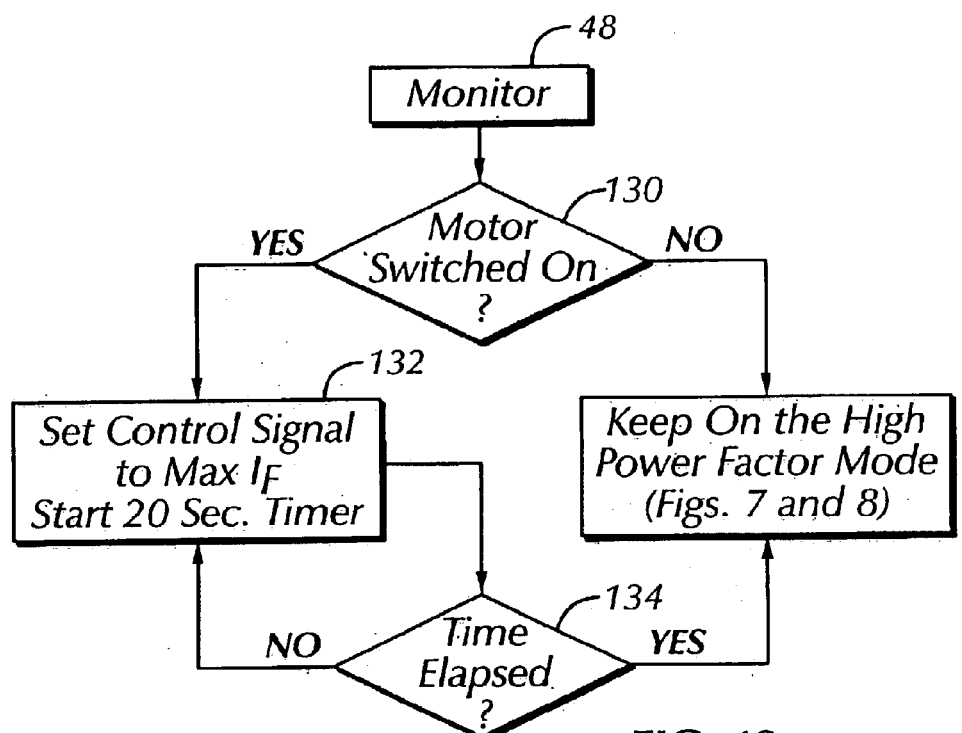
FIG. 13 is a more detailed flowchart of portions of the flowchart of FIG. 10.

FIG. 13 illustrates in more detail the performance of step 122 of FIG. 12. A decision instruction or step 130 examines input signals from the monitors 48, one on which is shown in FIG. 13, to see if the motor switch has been changed to an "ON" state. If not, operation reverts to the processes of FIGS. 7 and 8 to maintain the overall system in the high power factor mode.

If step 130 detects one of the motors has been switched to an "ON" state, a step 132 causes the control signal identifying full or maximum field current to be sent to the then on-line or operating motors. A timer is also then activated during step 132 to allow a preset time interval to elapse.

Next, an instruction 134 monitors the state of the timer started during step 132. If the preset time interval of the timer has not yet elapsed, the control signal is continued. If the event step 134 determines that the timer has reached the preset time interval established during 132, control of operations reverts to the processes of FIGS. 7 and 8 to maintain the overall system in the high power factor mode.

System behavior was monitored when a 10 hp induction motor $M_x$ was started. Parameters such as motor terminal voltages, starting currents, and motor acceleration time were recorded during the acceleration time of the induction motor, under a number of different examples of operation or test conditions. The first two examples show system behavior under typical loading conditions with two different power factors. In the rest of the examples the loads were increased to more than 70% of the system rated capacity.

EXAMPLE 1

Lagging Power Factor at 50% Load

In this example the power factor of the system is 82% lagging. The power quantities measured before starting the induction motor was then are summarized in the following Table.

|  | kVA | kW | kVAR | PF |
| --- | --- | --- | --- | --- |
| Total | 24.2 | 20 | 13.6 | −0.83 |
| Incoming Power $M_1$ | 11.1 | 9.0 | 6.4 | −0.82 |
| Incoming Power $M_2$ | 13.1 | 11.0 | 7.1 | −0.84 |

Figure 14:
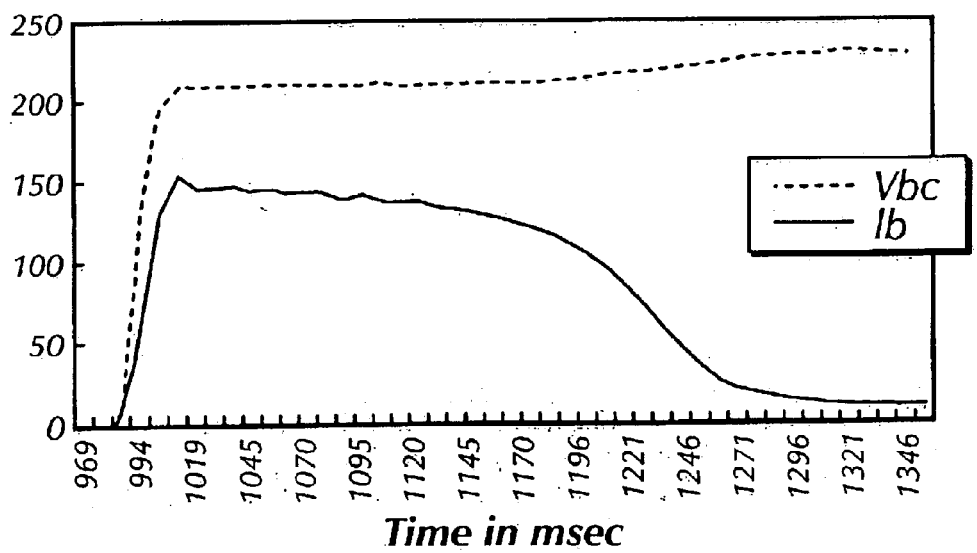
FIGS. 14, 15, 16, 17, 18 and 19 are plots of line voltage and line current as a function of time during start up of a motor in the power control system of FIG. 6.

The induction motor was then started. FIG. 14 shows line voltage ($V_{bc}$) and line current ($I_b$) trending over time. In this example the voltage dropped to 7.5% of the nominal voltage and the acceleration time was 350 msec.

EXAMPLE 2

Leading Power Factor at 50% Load

Loads in this example were similar to Example 1. The synchronous machines were momentarily over excited to support the bus voltage during the start of the induction motor. The following shows the system condition just before the start of the induction motor.

|  | KVA | kW | kVAR | PF |
| --- | --- | --- | --- | --- |
| Total | 47.2 | 20 | −42.8 (Gen) | 0.4 Leading |
| Incoming Power $M_1$ | 24.3 | 9.6 | −22.3 (Gen) | 0.4 Leading |
| Incoming Power $M_2$ | 22.9 | 10.3 | −20.5 (Gen) | 0.4 Leading |

Figure 15:
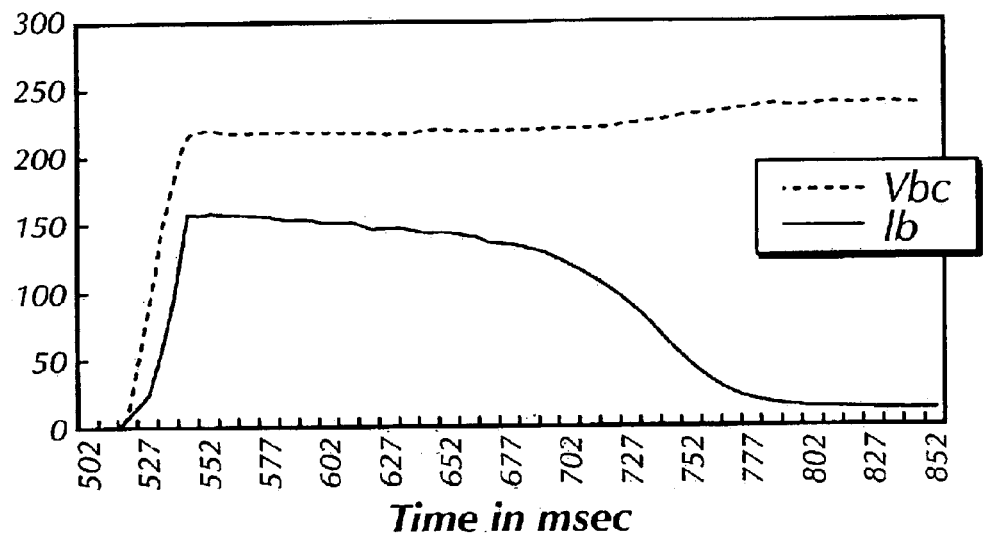

The induction motor $M_x$ was then started. FIG. 15 shows line voltage ($V_{bc}$ and line current ($I_b$) trending over time. In this case the voltage dropped to only 4% of the nominal voltage and the acceleration time was 300 msec.

EXAMPLE 3

Lagging Power Factor at 90% Load

In this example the system is highly loaded and/the power factor of the system was 83% lagging. The power quantities measured before starting the induction motor (Induction 1) are summarized in the following Table.

|  | KVA | kW | kVAR | PF |
|---|---|---|---|---|
| Total | 42.6 | 35.4 | 23.7 | −0.83 |
| Incoming Power $M_1$ | 23.7 | 19.8 | 13.0 | −0.83 |
| Incoming Power $M_2$ | 18.9 | 15.6 | 10.7 | −0.83 |

Figure 16:
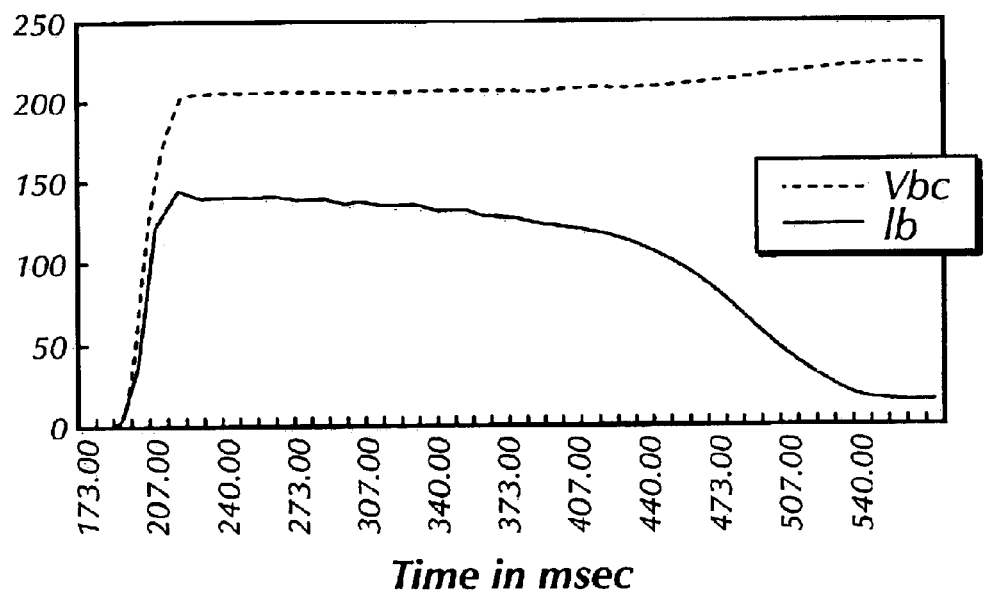
Figure 17:
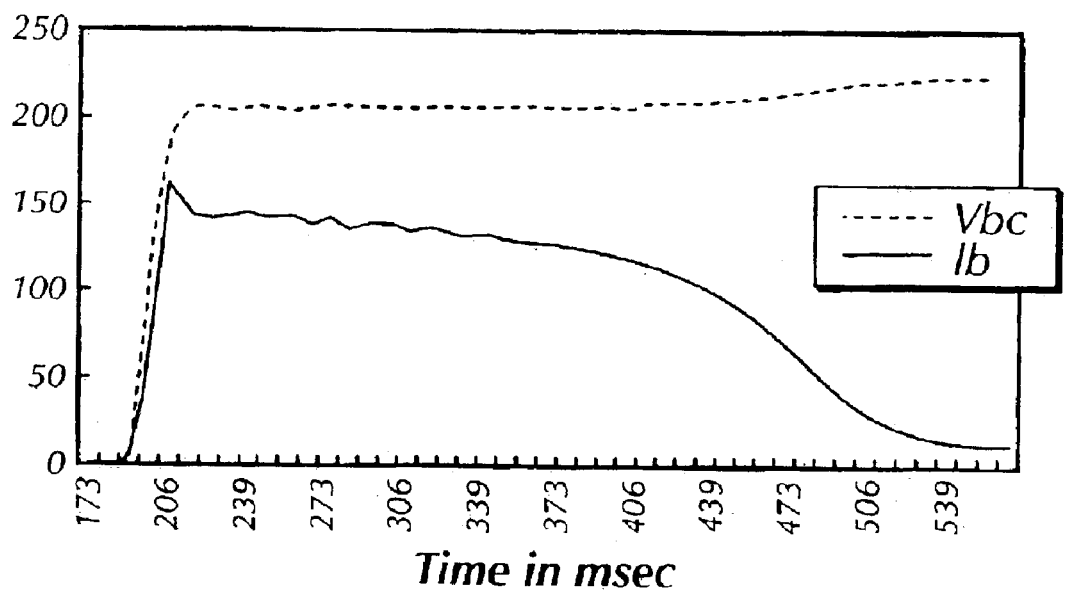

The induction motor $M_x$ was then started. FIG. 16 shows line voltage ($V_{bc}$) and line current ($I_b$) trending over time. In this example the voltage dropped to 10% of the nominal voltage and the acceleration time is 358 msec.

EXAMPLE 4

High PF With Synchronous Motors Operating at Unity Power Factor and 90% Load

In this example the power factor of the system was −98% lagging. The power quantities measured before starting the induction motor are summarized in the following Table.

|  | KVA | kW | Kvar | PF |
|---|---|---|---|---|
| Total | 37.7 | 36.8 | 7.8 | −0.98 |
| Incoming Power $M_1$ | 20.5 | 19.9 | 4.9 | −0.97 |
| Incoming Power $M_2$ | 17.2 | 16.9 | 2.9 | −0.98 |

The induction motor $M_x$ was then started. FIG. 21 shows line voltage ($V_{bc}$) and line current ($I_b$) trending over time. In this example the voltage dropped to 9% of the nominal voltage and the acceleration time was 350 msec.

EXAMPLE 5

Leading PF at 90% Load

In this example the power factor of the system is +92% leading. The power quantities measured before starting the induction motor are summarized in the following Table.

|  | kVA | kW | KVAR | PF |
|---|---|---|---|---|
| Total | 41.8 | 38.4 | −16.1 | 0.92 |
| Incoming Power $M_1$ | 22.2 | 21.1 | −6.8 | 0.95 |
| Incoming Power $M_2$ | 19.6 | 17.3 | −9.3 | 0.88 |

Figure 18:
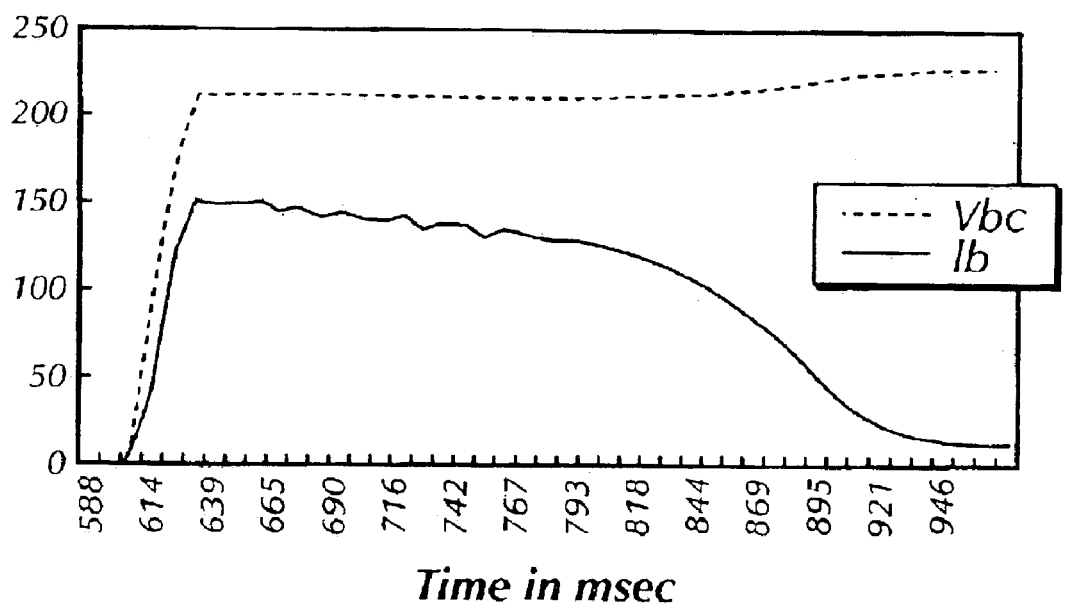

The induction motor $M_x$ was then started. FIG. 18 shows line voltage ($V_{bc}$) and line current ($I_b$) trending over time. In this example the voltage dropped to 7% of the nominal voltage and the acceleration time is 340 msec.

EXAMPLE 6

Extremely Leading PF at 25% Load

In this example the power factor of the system was extremely leading and the active power was low. The power quantities measured before starting the induction motor are summarized in the following Table.

|  | kVA | kW | kVAR | PF |
|---|---|---|---|---|
| Total | 42.6 | 10.6 | −41.2 | 0.25 |
| Incoming Power $M_1$ | 22.6 | 5.2 | −22.0 | 0.2 |
| Incoming Power $M_2$ | 20 | 5.5 | −19.2 | 0.3 |

Figure 19:
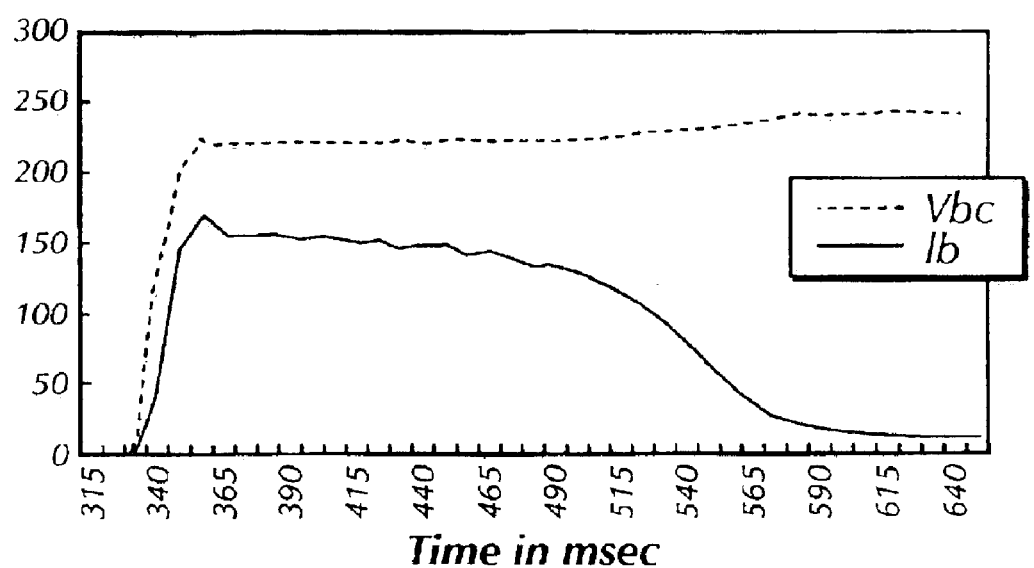

The induction motor $M_x$ was then started. FIG. 19 shows line voltage ($V_{bc}$) and line current ($I_b$) trending over time. In this example the voltage dropped to 3% of the nominal voltage and the acceleration time was 300 msec.

SUMMARY OF EXAMPLES

Summary of the examples explained above is shown in the following Table.

|  | Pre-Start Total Loads | | | | During Start | |
|---|---|---|---|---|---|---|
| Example | WA | kW | kVAR | PF | Acc. Time | Voltage Drop % |
| 1 | 24.2 | 20 | 13.6 | −0.83 | 350 msec | 7.5 |
| 2 | 47.2 | 20 | −22.3 | 0.4 | 300 msec | 4.0 |
| 3 | 42.6 | 35.4 | 23.7 | −0.83 | 358 msec | 10.0 |
| 4 | 37.7 | 36.8 | 7.8 | −0.98 | 350 msec | 9.0 |
| 5 | 41.8 | 38.4 | −16.1 | 0.92 | 340 msec | 7 |
| 6 | 42.6 | 10.6 | −41.2 | 0.25 | 300 msec | 3 |

Observations

1. Power Factor Improvement

Achieving a high power factor using online synchronous machines is a practical, feasible application. The power factor can be improved significantly using online synchronous motors without overloading them.

Some benefits from power factor improvements are readily apparent such as reducing power losses. However, the intangible benefits are also important when considering power factor correction. In general, improving the power factor helps motors run more efficiently and start more smoothly. This results in hidden benefits such as longer equipment life and reducing equipment outages, as maintenance costs can be significant. Also, it is estimated that the amount of energy saved due to power factor improvement is about 2% to 4% of the total energy consumption.

2. Voltage Drop Improvement

System stiffness and its ability to overcome severe voltage drops during large motor starts can be improved by momentarily overexciting the synchronous machines. In the experimental results, there is an apparent improvement in the voltage drop and acceleration time that can be achieved. The adaptive excitation control system of the present invention provides this capability.

Voltage drop improvement depends on the ratio of synchronous motor loads and other loads. As the number of online synchronous motors increases, the potential for improvement increases as well. The results suggest that the motor acceleration time can be reduced by as much as 10%. This is a good improvement that reduces electrical and thermal stresses on the machine during acceleration.

Having described the invention above, various modifications of the techniques, procedures, material, and equipment will be apparent to those in the art. It is intended that all such variations within the scope and spirit of the appended claims be embraced thereby.

What is claimed is:

1. A method of power control for conserving energy in a facility having synchronous machines, comprising the steps of:

monitoring the incoming power to the facility;

monitoring the reactive power demand of the facility;

monitoring the operation of the synchronous machines in the facility, the step of monitoring the operation including the steps of:

forming a measure of the power capability of the synchronous machines;

determining an overall power factor of the synchronous machines; selecting an optimum operating condition of the synchronous machines to bring the power factor to an optimum;

adjusting excitation current of the synchronous machines based on the selected optimum operating condition by performing the steps of:

when the determined overall power factor is leading, decreasing excitation current to the synchronous machines;

when the determined overall power factor is lagging, increasing excitation current to the synchronous machines;

when the determined overall power factor is neither leading nor lagging, repeating the step of determining an overall power factor of the synchronous machines; and repeating the step of determining the overall power factor and adjusting excitation current to maintain the selected optimum operating condition for the synchronous machines and conserve energy in the facility.

2. The method of claim 1, wherein the step of monitoring incoming power comprises the step of:

monitoring the power factor of the incoming power at a utility interface with the facility.

3. The method of claim 1, wherein the step of monitoring incoming power comprises the step of:

monitoring voltage levels of the incoming power at a utility interface with the facility.

4. The method of claim 1, wherein the step of monitoring the operation of the synchronous machines further includes the step of:

monitoring the status of the synchronous machines.

5. The method of claim 1, wherein the step of monitoring the operation of the synchronous machines further includes the step of:

monitoring the loading of the synchronous machines.

6. The method of claim 1, wherein the step of monitoring the operation of the synchronous machines further includes the step of:

monitoring the real power of the synchronous machines.

7. The method of claim 1, wherein the step of monitoring the operation of the synchronous machines further includes the step of:

monitoring the reactive power of the synchronous machines.

8. The method of claim 1, wherein the step of selecting an optimum operating condition further comprises the step of:

selecting a constant power factor mode for the synchronous machines.

9. The method of claim 1, wherein the step of selecting an optimum operating condition further comprises the step of:

selecting a constant voltage mode for the synchronous machines.

10. The method of claim 1, wherein the step of selecting an optimum operating condition further comprises the step of:

selecting a constant reactive power mode for the synchronous machines.

11. A power control system for conserving energy in a facility having synchronous machines, comprising sensor devices for monitoring the incoming power to the facility;

sensor devices for monitoring the reactive power demand of the facility;

a computer containing a programmed set of instructions including instructions for monitoring the operation of the synchronous machines in the facility, the instructions for monitoring the operation including instructions for the steps of:

forming a measure of the power capability of the synchronous machines; and determining an overall power factor of the synchronous machines;

the programmed set of instructions further including instructions for selecting an optimum operating condition of the synchronous machines to bring the power factor to an optimum;

the programmed set of instructions further including instructions for selecting an optimum operating condition, including instructions for the step of adjusting excitation current of the synchronous machines based on the determined overall power factor by performing the steps of:

when the determined overall power factor is leading, decreasing excitation current to the synchronous machines;

when the determined overall power factor is lagging, increasing excitation current to the synchronous machines;

when the determined overall power factor is neither leading nor lagging, repeating the step of determining the overall power factor of the synchronous machines; and the computer further sending signals to the synchronous machines and adjusting excitation current of the synchronous machines to achieve a selected optimum operating condition for the synchronous machines and conserve energy in the facility.

12. The power control system of claim 11, wherein the sensor devices for monitoring incoming power comprise:

sensor devices for monitoring the power factor of the incoming power at a utility interface with the facility.

13. The power control system of claim 11, wherein the sensor devices for monitoring incoming power comprise:

sensor devices for monitoring voltage levels of the incoming power at a utility interface with the facility.

14. The power control system of claim 11, wherein the sensor devices for monitoring the operation of the synchronous machines comprise:

sensor devices for monitoring the status of the synchronous machines.

15. The power control system of claim 11, wherein the set of instructions of the computer for monitoring the operation of the synchronous machines comprises:

instructions for causing the computer to monitor the loading of the synchronous machines.

16. The power control system of claim 11, wherein the set of instructions for the computer for monitoring the operation of the synchronous machines includes:

instructions for causing the computer to monitor the real power of the synchronous machines.

17. The power control system of claim 11, wherein the set of instruction of the computer for monitoring the operation of the synchronous machines includes:

instructions for causing the computer to monitor the reactive power of the synchronous machines.

18. The power control system of claim 11, wherein the set of instructions of the computer for selecting an optimum operating condition further comprises:

instructions for causing the computer to select a constant power factor mode as the operation mode of the synchronous machines.

19. The power control system of claim 11, wherein the set of instructions of the computer for selecting an optimum operating condition further comprises:

instructions for causing the computer to select a constant voltage mode as the operation mode of the synchronous machine.

20. The power control system of claim 11, wherein the set of instructions of the computer for selecting an optimum operating condition further comprises:

instructions for causing the computer to select a constant reactive power mode as the operation mode of the synchronous machines.

21. A method of supporting power supply bus voltage in a facility having motors and synchronous machines in connection with starting a motor in the facility, comprising the steps of:

monitoring the operation of the synchronous machines in the facility to cause the power factor of the machines to obtain a selected optimum operating condition to conserve energy in the facility;

detecting that a motor has been switched to a state for starting;

increasing the field current of the running synchronous machines prior to start of the motor to produce reactive power;

allowing a specific time interval to begin;

maintaining the field current of the synchronous machines at the increased field current level to produce reactive power until the specified time interval elapses;

when the specific time interval elapses returning to the step of monitoring the operation of the synchronous machines in the facility.

22. The method of claim 21, wherein the specified time interval is a specified time elapsing without the motor having started.

23. The method of claim 21, wherein the step of increasing the field current comprises the step of:

increasing the field current of the running synchronous machines prior to start of the motor to produce reactive power in excess of its rated power.

24. The method of claim 21, wherein the step of increasing the field current comprises the step of:

increasing the field current of the running synchronous machines prior to start of the motor to produce reactive power to a range of from 100% to 150% of its rated power.

25. A power control system for a facility having motors and synchronous machines and having support of bus voltage in connection with starting of a motor in the facility, comprising:

a computer containing a programmed set of instructions including instructions causing the computer to perform the steps of:

monitoring the operation of the synchronous machines in the facility to cause the power factor of the machines to obtain a selected optimum operating condition to conserve energy in the facility;

detecting that a motor has been switched to a state for starting;

increasing the field current of the running synchronous machines prior to start of the motor to produce reactive power;

allowing a specific time interval to begin;

maintaining the field current of the synchronous machines at the increased field current level to produce reactive power until the specified time interval elapses;

when the specific time interval elapses returning to the step of monitoring the operation of the synchronous machines in the facility; and causing the field current of the running synchronous machines to increase for the synchronous machines to produce reactive power until the specified time interval elapses.

26. The power control system of claim 25, wherein the specified time interval is a specified time elapsing without the motor having started.

* * * * *